(12) United States Patent
Vaikar

(10) Patent No.: US 8,055,614 B1
(45) Date of Patent: Nov. 8, 2011

(54) METHOD AND APPARATUS FOR PROVIDING SINGLE INSTANCE RESTORATION OF DATA FILES

(75) Inventor: Amol Manohar Vaikar, Pune (IN)

(73) Assignee: Symantec Corporation, Mountain View, CA (US)

( * ) Notice: Subject to any disclaimer, the term of this patent is extended or adjusted under 35 U.S.C. 154(b) by 325 days.

(21) Appl. No.: 12/343,440

(22) Filed: Dec. 23, 2008

(51) Int. Cl.
*G06F 17/30* (2006.01)

(52) U.S. Cl. ........ 707/610; 707/640; 707/657; 707/674; 707/675; 707/676; 707/677; 707/678; 707/679; 707/680; 707/681; 707/695

(58) Field of Classification Search ................. 707/610, 707/640, 657, 674, 675, 676, 677, 679, 680, 707/678, 681, 695
See application file for complete search history.

(56) References Cited

U.S. PATENT DOCUMENTS

| | | | | |
|---|---|---|---|---|
| 5,778,395 | A * | 7/1998 | Whiting et al. ................. | 1/1 |
| 5,812,398 | A * | 9/1998 | Nielsen ........................... | 705/1.1 |
| 6,389,433 | B1 * | 5/2002 | Bolosky et al. ............... | 707/749 |
| 6,513,051 | B1 * | 1/2003 | Bolosky et al. ................. | 1/1 |
| 6,799,206 | B1 * | 9/2004 | Workman et al. .............. | 709/223 |
| 6,865,577 | B1 * | 3/2005 | Sereda ............................ | 707/699 |
| 7,003,551 | B2 * | 2/2006 | Malik .............................. | 709/206 |
| 7,165,082 | B1 * | 1/2007 | DeVos ................................ | 1/1 |
| 7,251,680 | B2 * | 7/2007 | DeVos ............................. | 709/206 |
| 7,469,260 | B2 * | 12/2008 | Enko et al. ........................ | 1/1 |
| 7,610,307 | B2 * | 10/2009 | Havewala et al. ................ | 1/1 |
| 7,672,981 | B1 * | 3/2010 | Faibish et al. ........... | 707/999.204 |
| 7,769,971 | B2 * | 8/2010 | Cremelie et al. ............... | 711/162 |
| 7,818,517 | B1 * | 10/2010 | Glade et al. ..................... | 711/154 |
| 7,827,150 | B1 * | 11/2010 | Wu et al. ......................... | 707/674 |
| 7,849,059 | B2 * | 12/2010 | Prahlad et al. ................. | 707/648 |
| 7,941,459 | B1 * | 5/2011 | Erickson ........................ | 707/803 |
| 2005/0033777 | A1 * | 2/2005 | Moraes et al. ................. | 707/202 |
| 2006/0224846 | A1 * | 10/2006 | Amarendran et al. ........ | 711/162 |
| 2006/0230244 | A1 * | 10/2006 | Amarendran et al. ........ | 711/162 |
| 2007/0033338 | A1 * | 2/2007 | Tsern ............................. | 711/106 |
| 2007/0033339 | A1 * | 2/2007 | Best et al. ...................... | 711/106 |
| 2007/0100913 | A1 * | 5/2007 | Sumner et al. ................. | 707/204 |
| 2008/0243878 | A1 * | 10/2008 | de Spiegeleer et al. ........ | 707/100 |
| 2008/0243953 | A1 * | 10/2008 | Wu et al. ......................... | 707/204 |
| 2010/0082672 | A1 * | 4/2010 | Kottomtharayil et al. .... | 707/770 |
| 2010/0153338 | A1 * | 6/2010 | Ngo et al. ...................... | 707/610 |

OTHER PUBLICATIONS

Nanda, Arup, "Faster Backup, Faster Recovery," as published in Oracle Magazine, Nov./Dec. 2004. Downloaded from web site http://www.oracle.com/technology/oramag/oracle/04-nov/o64rman.html on Apr. 15, 2009.

"Hard Drive Recovery," Disk Recovery Software and Hard Drive Recovery tool for Windows, Copyright 2000-2009 R-Tools Technology Inc. Downloaded from web site http://www.r-studio.com/ on Apr. 15, 2009.

(Continued)

*Primary Examiner* — Thanh-Ha Dang
(74) *Attorney, Agent, or Firm* — Campbell Stephenson LLP

(57) ABSTRACT

A method and apparatus for providing single instance restoration of data files is provided. In one embodiment, a method for using a signature database to provide a single instance data restoration solution includes processing a restore request for a data file, wherein the data file is associated with a signature and examining a signature database using the signature to identify at least one locally available data file having at least one signature that matches the signature associated with the data file.

14 Claims, 3 Drawing Sheets

OTHER PUBLICATIONS

"OLEXP: How to Restore Newsgroup Messages After Local File Clean Up," Article ID: 175134—Last Review: Jan. 22, 2007—Revision: 3.1. Copyright 2009 Microsoft. Downloaded from web site http://support.microsoft.com/kb/175134 on Apr. 15, 2009.

"Our software products for Windows," Software for local area networks, intranets and the Internet, Copyright 2000-2009 SoftPerfect Research. Downloaded from web site http://www.softperfect.com/ on Apr. 15, 2009.

"8.6.3878 Hotfix 52—Restore (Redirected Restore of Single Instance Storage [SIS] data to the local media server results in disconnected stub files)," Document ID: 266315, Symantec, Last Updated: Apr. 2, 2004. Downloaded from web site http://seer.entsupport.symantec.com/docs/266315.htm on Apr. 15, 2009.

"How to restore a volume that is managed by Single Instance Storage," Article ID: 263027—Last Review: Oct. 31, 2006—Revision: 2.3. Downloaded from web site http://support.microsoft.com/kb/263027 on Apr. 15, 2009.

* cited by examiner

US 8,055,614 B1

METHOD AND APPARATUS FOR PROVIDING SINGLE INSTANCE RESTORATION OF DATA FILES

BACKGROUND

1. Field of the Invention

Embodiments of the present invention generally relate to backup and restoration techniques and, more particularly, to a method and apparatus for providing single instance restoration of data files.

2. Description of the Related Art

In a typical computing environment, an organization may employ a number of technologies to store, secure and/or recover mission critical data. For example, the organization may employ one or more data protection systems to backup and recover the mission critical data after a disaster or data corruption. As another example, the organization may employ one or more security systems to detect and/or mitigate network-based threats, such as viruses, intrusions, SPAM and/or the like. Furthermore, the organization may employ one or more data leakage prevention technologies at a content filter (e.g., at a network gateway, mail server and/or the like) to monitor and control data communications between computing devices within the organization and another computing device.

In the typical computing environment, various data files (e.g., such as documents, spreadsheets, presentations, structural designs and/or the like) are stored at one or more computers (i.e., clients). Sometimes, the various data files are backed up to one or more storage devices (e.g., a tape drive, a hard disk drive and/or the like) on a regular basis. Generally, backups may be performed to protect the data files that store important, critical information. As such, the data files are restored as and when required. Data file restoration ensures uninterrupted productivity for the typical computing environment.

Currently, Single Instance Storage (SIS) techniques are utilized to reduce network bandwidth consumption during a backup and/or restore process for the data files. Generally, a signature (e.g., a hash value, a parity bit, a checksum bit and/or the like) is computed and stored for each of the backed up data files. The signatures are leveraged during data file restoration of the one or more data files. However, a certain data file may have the same signature as one or more data files that are already available locally. As such, multiple copies of the certain data file are restored.

For example, a user may communicate a restore request to a file server for a file A.TXT due to a failure, accidental deletion and/or data corruption. Such a file may be stored on the file server or locally at a client computer. In response, the file server proceeds to service the restore request and communicates the file A.TXT across the data network. As a result, available network bandwidth capacity is wasted because a server copy of the file A.TXT was used to service the restore request instead of a local copy.

Therefore, there is a need in the art for a method and apparatus for providing single instance restoration of data files.

SUMMARY OF THE INVENTION

Embodiments of the present invention comprise a method and apparatus for providing single instance restoration of data files. In one embodiment, a method for using a signature database to provide a single instance data restoration solution, includes processing a restore request for a data file, wherein the data file is associated with a signature and examining a signature database using the signature to identify at least one locally available data file having at least one signature that matches the signature associated with the data file.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
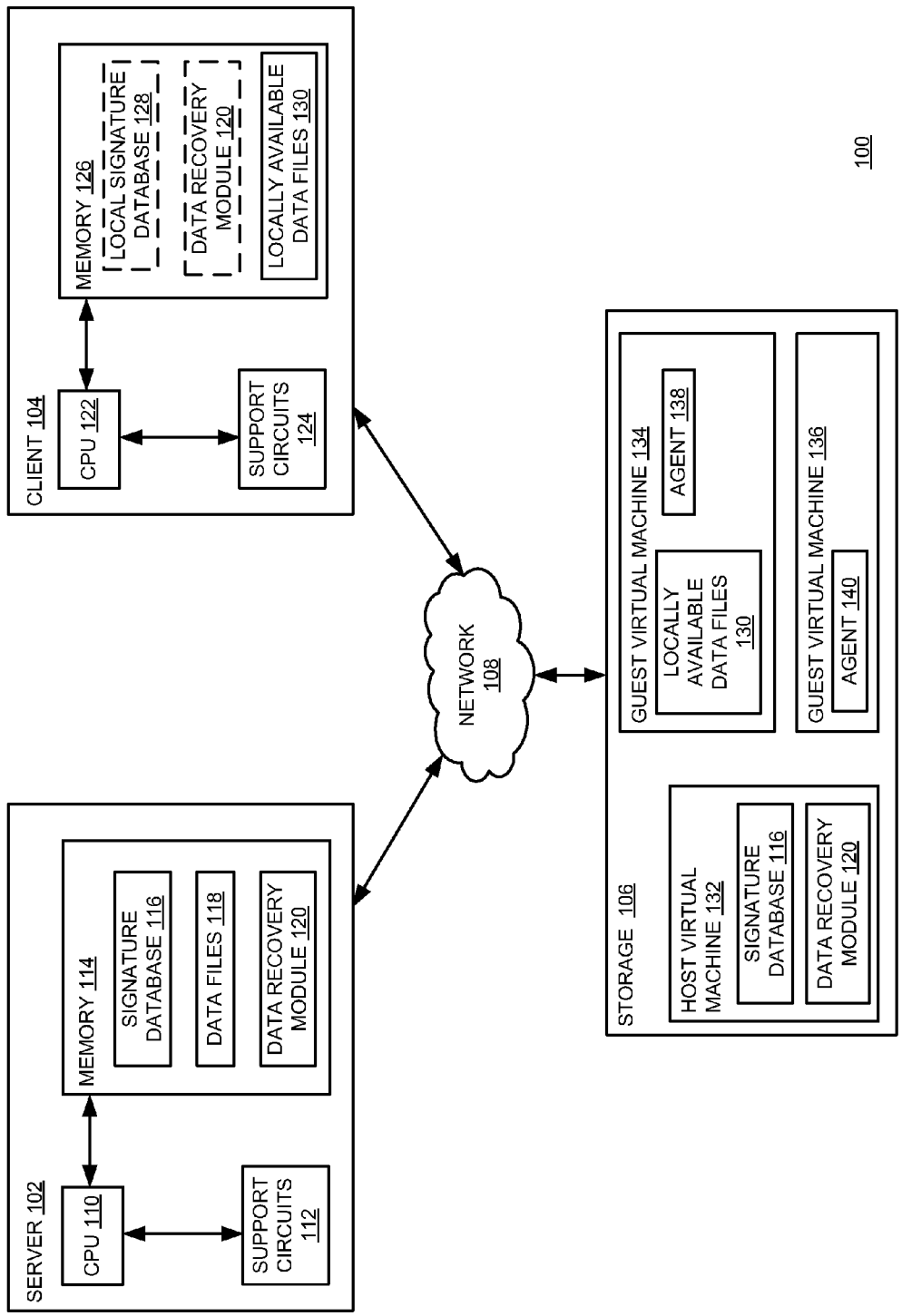
FIG. 1 is a block diagram of a system for providing single instance restoration of data files according to one or more embodiments of the present invention.

FIG. 1 is a block diagram of a system 100 for providing single instance restoration of data files according to various embodiments of the present invention. The system 100 comprises a server 102, a client 104 and storage 106, where each is coupled to each other through a network 108.

The server 102 is a type of computing device (e.g., a laptop, a desktop, a Personal Digital Assistant (PDA) and/or the like), such as those generally known in the art. The server 102 includes a Central Processing Unit (CPU) 110, various support circuits 112 and a memory 114. The CPU 110 may comprise one or more commercially available microprocessors or microcontrollers that facilitate data processing and storage. The various support circuits 112 facilitate the operation of the CPU 110 and include one or more clock circuits, power supplies, cache, input/output circuits, and the like. The memory 114 comprises at least one of Read Only Memory (ROM), Random Access Memory (RAM), disk drive storage, optical storage, removable storage and/or the like. The memory 114 includes various data, such as a signature database 116 and data files 118. The memory 114 further includes various software packages, such as a data recovery module 120.

The client 104 is a type of computing device (e.g., a laptop, a desktop, a Personal Digital Assistant (PDA) and/or the like), such as those generally known in the art. The client 104 includes a Central Processing Unit (CPU) 122, various support circuits 124 and a memory 126. The CPU 122 may comprise one or more commercially available microprocessors or microcontrollers that facilitate data processing and storage. The various support circuits 124 facilitate the operation of the CPU 122 and include one or more clock circuits, power supplies, cache, input/output circuits, and the like. The memory 126 comprises at least one of Read Only Memory (ROM), Random Access Memory (RAM), disk drive storage, optical storage, removable storage and/or the like. The memory 126 includes various data, such as one or more locally available data files 130. Optionally, the memory 126 includes a local signature database 128 and the data recovery module 120.

The network 108 comprises a communication system that connects computers by wire, cable, fiber optic and/or wireless link facilitated by various types of well-known network elements, such as hubs, switches, routers, and the like. The network 108 may employ various well-known protocols to communicate information amongst the network resources. For example, the network 108 may be a part of the internet or intranet using various communications infrastructure, such as Ethernet, WiFi, WiMax, General Packet Radio Service (GPRS), and the like.

The storage 106 generally includes various components (i.e., hardware and software) that are configured to manage storage resources within a computing environment. The storage 106 generally includes one or more data storage devices (e.g., hard disk drives, optical drives, magnetic tape drives and/or the like) and storage management software that provides an interface (e.g., Integrated Drive Electronics/AT Attachment (IDE/ATA), Small Computer Systems Interface (SCSI) and/or the like) to the one or more data storage devices for one or more computing devices, such as the server 102. The storage 106 facilitates permanent storage (i.e., a backup) of various computer data to backup media (e.g., sequential backup media (i.e., magnetic tape), optical storage media (e.g., hard disk) and/or the like).

In one embodiment, the storage 106 includes one or more virtual machine files (e.g., a .VMX file, a .VMDK file, a .VHD file and/or the like). The virtual machine files define one or more memory states for one or more virtual machines. The virtual machine files may be mounted by virtualization software to generate the one or more virtual machines that represent one or more physical machines, such as a host virtual machine 132, a guest virtual machine 134 and a guest virtual machine 136. In one embodiment, various software programs at the server 102 interact with the one or more virtual machines. For example, the server 102 may service a restore request from the host virtual machine 132 using the data files 118.

According to various embodiments, the data files 118 include user files provided to various clients, such as the client 104, from a file server, such as the server 102. For example, each user may have a user directory at the server 102 that maintains organization related data (e.g., emails, work product, presentations, training materials and/or the like). Similarly, the locally available data files 130 may be local versions of the data files 118. Alternatively, the data files 118 do not include the locally available data files 130. As such, the signature database 116 does not include signatures for the locally available data files 130. Instead, the local signature database 128 at the client 104 includes the signature for the locally available data files 130.

According to various embodiments, the signature database 116 stores one or more signatures associated with each data file of the data files 118. Notably, the signature database 116 may include file-level and/or block-level signatures. Generally, signatures may be hash values, parity bits, checksum bits and/or the like. In one embodiment, the signature database 116 stores a timestamp for each signature that indicate a signature calculation time. Such a timestamp may be utilized to determine whether a signature corresponds with a most recent version of a particular data file as explained further below.

In one embodiment, the signature database 116 is updated during a backup process of one or more data files of the data files 118. In another embodiment, the signature database 116 is updated by a background process. In a yet another embodiment, a file system filter driver (e.g., a change tracker) updates the signature database 116 as the data files 118 are modified. According to another embodiment, the signature database 116 is updated by an application service that hooks to a file change log and/or event information that identifies one or more modified data files of the data files 118.

Optionally, the client 104 includes the local signature database 128 for identifying the locally available data files 130. In one or more embodiments, the local signature database 128 may be used instead of or in addition to the signature database 116. As such, the data recovery modules 120 at the client 104 may utilize the local signature database 128 to identify a matching signature for the signature of the requested data file for restoration. In one embodiment, the local signature database 128 includes signatures for data files that were not backed up during a backup process, such as the locally available data files 130. As such, the signature database 116 does not include such signatures.

The data recovery module 120 includes software code that is configured to restore a particular data file. According to various embodiments, the data file may be restored to the client 104 and/or the guest virtual machine 134 using locally available data files 130 and/or the data files 118. The data recovery module 120 examines the signature database 116 to identify one or more locally available data files of the locally available data files 130 having a signature that matches a signature associated with the particular data file. Alternatively, the data recovery module 120 examines the local signature database 128 to identify the one or more locally available data files of the locally available data files 130 having a signature that matches the signature associated with the particular data file.

It is appreciated that the one or more locally available data files may include recent versions of the particular data file and/or completely different data files. In one or more embodiments that employ block-level signatures, the data recovery module 120 may restore the particular data file using one or more data blocks of a completely different locally available data file of the locally available data files 130. On the other hand, the data recovery module 120 may restore the particular data file using a locally available data file of the locally available data files 130 in entirety according to one or more embodiments that employ file-level signatures.

As an example, the signature database 116 and/or the local signature database 128 includes block-level signatures associated with the locally available files 130. Furthermore, the data file A.TXT may include a logical data block associated with a block-level signature of "0011" that matches a logical data block in data file B.TXT. In addition, another logical data block of the data file A.TXT having a block-level signature of "1100" is determined to match a data block in a completely different data file C.TXT on the client 104.

Subsequently, the data recovery module 120 verifies the one or more locally available data files of the locally data files 130. In one embodiment, the data recovery module 120 examines one or more timestamps for the one or more locally available data files. For each of the one or more locally available data files, the data recovery module 120 compares a modification time with a signature calculation time to determine whether the one or more locally available data files are as up to date as the particular data file according to one embodiment. If a signature was computed prior to a modification to the one or more locally available data files, then the data recovery module 120 services the restore request using the data files 118 because the one or more locally available data files are not up to date. Otherwise, the data recovery module 120 instructs the client 104 to service the restore request using the one or more locally available data files.

As an example and not as a limitation, a backup process selects one or more data files to be backed up. The backup process may be performed by enterprise backup software (e.g., SYMANTEC NetBackup products, SYMANTEC BackupExec products and/or the like). In one embodiment, the data recovery module 120 examines the signature database 116 and determines that one or more signatures for the one or more data files are not stored. While performing the backup process, the data recovery module 120 computes the one or more signatures for the one or more data files. Then, the signature database 116 is updated to include the one or more signatures.

On the other hand, if the data recovery module 120 examines the signature database 116 and identifies metadata (e.g., a file name) of a data file that matches metadata of a particular data file of the one or more data files, then the particular data file already exists within the signature database 116. As such, there is no need to backup the particular data file because an exact copy was previously backed up. Alternatively, the data recovery module 120 examines the local signature database 128 and identifies metadata of a local data file that matches the metadata of the particular data file.

Then, the data recovery module 120 examines a timestamp associated with the data file within the signature database 116 and/or the local data file within the local signature database 120 to access a signature calculation time. If the data recovery module 120 determines that the signature calculation time is earlier than a modification time indicated by a timestamp associated with the particular data file, the data recovery module 120 computes a signature for the particular data file and updates the signature database 116 and/or the local signature database 120 because the particular data file is more recent. Subsequently, the data recovery module 120 backups up the particular data file.

As another example, virtual machine files may be mounted to generate a plurality of virtual machines, such as the host virtual machine 132. Each virtual machine of the one or more virtual machines runs an operating system for processing one or more volumes. In one embodiment, the host virtual machine 132 supports a virtualization layer (e.g., a Hypervisor, VMware Consolidated Backup (VCB), and/or the like) and runs a host operating system to facilitate server virtualization over one or more guest virtual machines, such as the guest virtual machine 134 and the guest virtual machine 136. In one embodiment, the guest virtual machine 134 uses a guest operating system to interact with the host operating system in order to access computer resources.

In operation, the data recovery module 120 running within the host virtual machine 132 processes a restore request for a data file from a particular guest virtual machine. The restore request may be fired from a host operating system or a guest operating system. The data recovery module 120 examines the signature database 116 within the host virtual machine 132 to determine a signature of the data file to be restored. For example, the data recovery module 120 searches the signature database 116 to locate a signature associated with a file name of the data file. Then, the data recovery module 120 examines the signature database 116 to identify one or more locally available data files at the particular guest virtual machine and/or another guest virtual machine that have a signature that matches the signature of the data file. In one embodiment, the data recovery module 120 services the restore request using the one or more locally available data files.

In one embodiment, the data recovery module 120 processes the restore request for the data file from the guest virtual machine 134. Subsequently, the data recovery module 120 examines the signature database 116 to identify one or more locally available data files of the locally available data files 130 within the guest virtual machine 134 that has a signature that matches the signature of the data file. In one embodiment, the data recovery module 120 determines that the signature of the data file does not match any signature associated with the locally available data files 130. As such, the data recovery module 120 examines the signature database 116 to identify one or more locally available data files at the guest virtual machine 136 that have a signature that matches the signature of the data file.

Accordingly, if the one or more locally available data files are identified within the guest virtual machine 136, the data recovery module 120 uses an agent 140 within the guest virtual machine 136 to pull the one or more locally available data files. The one or more locally available data files may be made accessible via various protocols (e.g., File Transfer Protocol (FTP), Network File System (NFS), Common Internet File System (CIFS) and the like). A snapshot is generated and a virtual disk is mounted such that the one or more locally available data files may be accessed from the guest virtual machine 134. Various technologies (e.g., MICROSOFT Shadow Copy and/or the like) may be employed to generate the snapshot. Then, the data recovery module 120 accesses the one or more locally available data files and uses an agent 138 within the guest virtual machine 134 to push the one or more locally available data files.

Alternatively, the signature database 116 and/or the local signature database 128 may be used for non-data file restoration purposes according to various embodiments. In one alternative embodiment, the signature database 116 and/or the local signature database 128 may be utilized by Data Leakage Prevention (DLP) technologies to prevent unwanted disclosure of the data files 118 and/or the locally available data files 130. For example, a signature associated with a particular data file to be communicated is compared with signatures associated with confidential and/or privileged data files. If there are one or more matching signatures, then the communication of the particular data file is prevented. For example, the particular data file may include confidential information that is marked for data leakage prevention.

In another alternative embodiment, the signature database 116 and/or the local signature database 128 may be utilized by computer security technologies to detect malicious data files (e.g., viruses, malware and/or the like). For example, a signature associated with a malicious data file is compared with signatures associated with various data files (e.g., documents, presentations, emails and/or the like). If the signature matches one or more signatures associated with one or more data files, then the one or more data files are most likely malicious as well. For example, the one or more data files may be infected with a same virus that infected the malicious data file.

Figure 2:
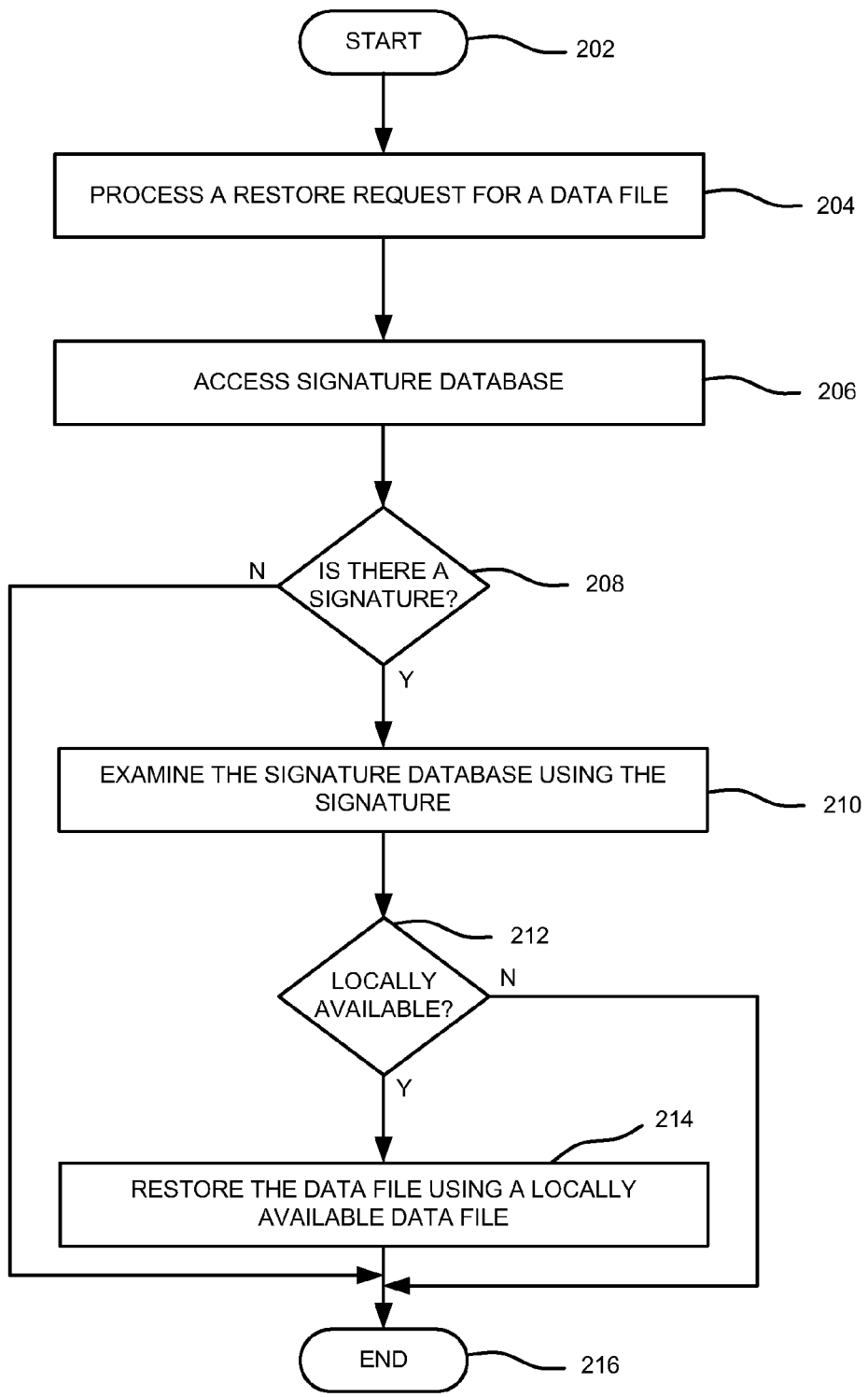
FIG. 2 is a flow diagram of a method for providing single instance restoration of data files according to one or more embodiments of the present invention.

FIG. 2 is a flow diagram of a method 200 for providing single instance restoration of data files according to one embodiment of the present invention. The method 200 starts at step 202 and proceeds to step 204, at which a request to restore a data file is processed.

At step 206, a signature database (e.g., the signature database 116 and/or the local signature database 128 of FIG. 1) is accessed. At step 208, a determination is made as to whether there is a signature associated with the data file within the signature database. If it is determined that there is a signature associated with the data file within the signature database (option "YES"), then the method 200 proceeds to step 210. If, at step 208 it is determined that there is no signature associated with the data file within the signature database (option "NO"), then the method 200 proceeds to step 216.

At step 210, the signature database is examined using the signature associated with the data file. In one embodiment, the signature associated with the data file is compared with signatures of locally available data files to identify one or more locally available data files having a matching signature. At step 212, a determination is made as to whether the data file is locally available. If it is determined that the data file is not locally available then the method 200 proceeds to step 216. If, at step 212, it is determined that the data file is locally available, then the method 200 proceeds to step 214. At step 214, the data file is restored using one or more locally available data files. The method 200 proceeds to step 216, at which the method 200 ends.

Figure 3:
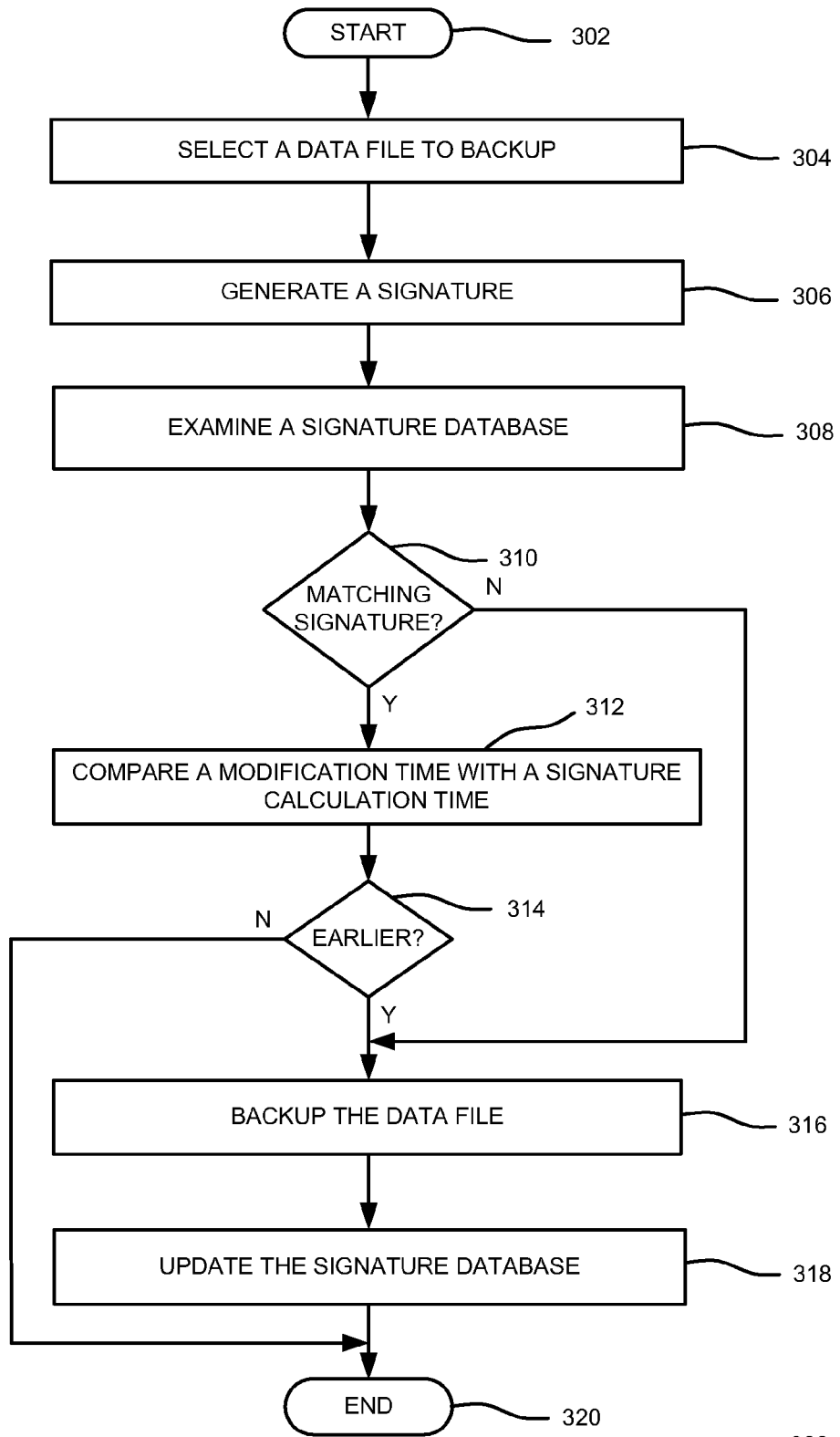
FIG. 3 is a flow diagram of a method for updating a signature database according to one or more embodiments of the present invention.

FIG. 3 is a flow diagram of a method 300 for updating a signature database according to one embodiment of the present invention. The method 300 starts at step 302 and proceeds to step 304, at which a data file to be backed up is selected. At step 306, a signature associated with the data file is generated.

At step 308, a signature database (e.g., the local signature database 128 of FIG. 1) is examined using the signature. At step 310, a determination is made as to whether the signature associated with the data file matches a signature of another data file in the signature database. If, it is determined that the signature associated with the data file matches a signature of another data file in the signature database (option "YES"), then the method 300 proceeds to step 312. If, at step 310, it is determined that the signature associated with the data file does not match any signature in the signature database (option "NO"), then the method 300 proceeds to step 316.

At step 312, a modification time associated with the other data file is compared with the signature calculation time associated with the other data file. In one embodiment, a timestamp associated with the other data file includes the modification time and the signature calculation time. At step 314, a determination is made as to whether the signature calculation time is earlier than the modification time. If, it is determined that the signature calculation time is earlier than the modification time (option "YES"), then the method 300 proceeds to step 316. If, at step 314 it is determined that the signature calculation time is not earlier than the modification time (option "NO"), then the method 300 proceeds to step 320. At step 316, the data file is backed up. At step 318, the signature database is updated with the signature associated with the other data file and the method 300 proceeds to step 320. At step 320, the method 300 ends.

While the foregoing is directed to embodiments of the present invention, other and further embodiments of the invention may be devised without departing from the basic scope thereof, and the scope thereof is determined by the claims that follow.

The invention claimed is:

1. A method for using a signature database, comprising:
   a computer system processing a restore request for a data file, wherein the data file is associated with a signature;
   examining the signature database using the signature to identify at least one locally available data file having at least one signature that matches the signature associated with the data file;
   comparing a time when the at least one signature was calculated with a modification time stamp of the at least one locally available data file; and
   restoring the data file using the at least one locally available data file in response to determining that the modification time stamp predates the time when the at least one signature was calculated.

2. The method of claim 1, wherein the signature comprises at least one of a block-level signature or a file-level signature.

3. The method of claim 1, further comprising instructing the computer system to use the at least one locally available data file to service the restore request.

4. The method of claim 1, further comprising communicating information regarding the at least one locally available data file.

5. The method of claim 1, wherein the signature database is located in at least one of a server that receives the restore request or a computer that communicates the restore request.

6. The method of claim 1, wherein the signature database is located in a host virtual machine.

7. The method of claim 6, wherein the at least one locally available data file is located with at least one of a guest virtual machine that communicated a restore request for the data file or another guest virtual machine.

8. The method of claim 1, further comprising updating the signature database with the signature of the data file.

9. One or more non-transitory computer readable mediums comprising instructions, wherein a method is implemented in response to executing the instructions, the method comprising:
   processing a restore request for a data file, wherein the data file is associated with a signature;
   examining a signature database using the signature to identify at least one locally available data file having at least one signature that matches the signature associated with the data file;
   comparing a time when the at least one signature was calculated with a modification time stamp of the at least one locally available data file; and
   restoring the data file using the at least one locally available data file in response to determining that the modification time stamp predates the time when the at least one signature was calculated.

10. The one or more non-transitory computer readable mediums of claim 9, wherein the signature database is located in at least one of a server that receives the restore request or a computer that communicates the restore request.

11. The one or more non-transitory computer readable mediums of claim 9, wherein the signature database is located in a host virtual machine and the at least one locally available data file is located with at least one of a guest virtual machine that communicated the restore request or another guest virtual machine.

12. A system comprising:
    a client for generating a restore request for a data file; and
    a server comprising a data recovery module for processing the restore request for the data file, wherein the data file is associated with a signature, examining a signature database using the signature to identify at least one locally available data file having at least one signature that matches the signature associated with the data file, comparing a time when the at least one signature was calculated with a modification time stamp of the at least one locally available data file, and restoring the data file using the at least one locally available data file in response to determining that the modification time stamp predates the time when the at least one signature was calculated.

13. The system of claim 12, wherein the signature database is located in the server that receives the restore request or a computer that communicates the restore request.

14. The system of claim 12, wherein the signature database is located in a host virtual machine and the at least one locally available data file is located with a guest virtual machine that communicated the restore request or another guest virtual machine.

* * * * *